Figure 1:
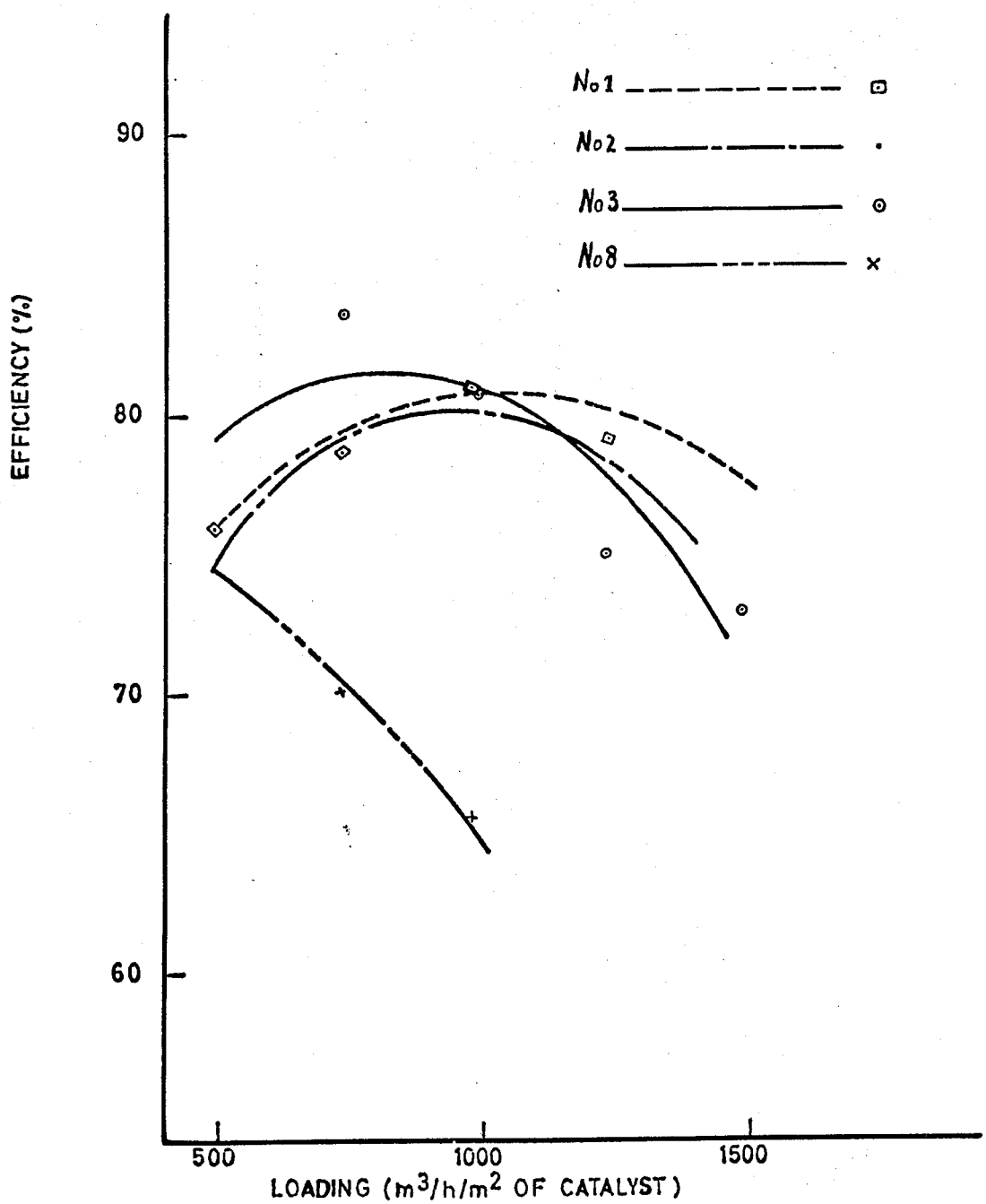

ical processes and containing active cobalt (II, III) oxide together with an oxide of scandium, yttrium, lanthanum, cerium, praseodymium, neodymium, samarium, europium, gadolinium, terbium, dysprosium, holmium, erbium, thulium, ytterbium or lutetium, or a mixture of at least two of these oxides. The catalysts are prepared by co-precipitating from solution as carbonates or basic carbonates, cobalt and at least one of the elements of the oxides, washing and drying the precipitate and heating the dried precipitate within the temperature range of from 250° to 450°C for a period of time sufficient to convert the carbonates substantially to their respective oxides, comminuting the mixture of oxides, shaping the mixture into bodies and heating the shaped bodies within the temperature range of from 600° to 850°C.

United States Patent

Hughes

[11] 3,888,792
[45] June 10, 1975

[54] CATALYST OF COBALT OXIDE AND A RARE EARTH METAL OXIDE AND ITS METHOD OF PREPARATION

[75] Inventor: David Owen Hughes, Boksburg, South Africa

[73] Assignee: African Explosives and Chemical Industries Limited, Johannesburg, South Africa

[22] Filed: Sept. 24, 1973

[21] Appl. No.: 400,129

Related U.S. Application Data

[63] Continuation of Ser. No. 151,103, June 8, 1971, abandoned.

[30] Foreign Application Priority Data

June 26, 1970 South Africa.................. 70/4407

[52] U.S. Cl. ............... 252/462; 252/472; 423/404
[51] Int. Cl. ............................................ B01j 11/22
[58] Field of Search ............ 252/462, 472; 423/404

[56] References Cited
UNITED STATES PATENTS

| | | | |
|---|---|---|---|
| 1,207,706 | 12/1916 | Bosch et al. ........................ | 423/404 |
| 1,918,957 | 7/1933 | Bray..................................... | 252/472 |
| 2,570,882 | 10/1951 | Stiles.................................... | 252/472 X |

OTHER PUBLICATIONS

Richardson et al., General College Chemistry, N.Y., Henry Holt & Co., 1940, p. 463.

Primary Examiner—Winston A. Douglas
Assistant Examiner—W. J. Shine
Attorney, Agent, or Firm—Cushman, Darby & Cushman

[57] ABSTRACT

Catalysts in the form of shaped bodies having adequate mechanical strength for use in industrial processes and containing active cobalt (II, III) oxide together with an oxide of scandium, yttrium, lanthanum, cerium, praseodymium, neodymium, samarium, europium, gadolinium, terbium, dysprosium, holmium, erbium, thulium, ytterbium or lutetium, or a mixture of at least two of these oxides. The catalysts are prepared by co-precipitating from solution as carbonates or basic carbonates, cobalt and at least one of the elements of the oxides, washing and drying the precipitate and heating the dried precipitate within the temperature range of from 250° to 450°C for a period of time sufficient to convert the carbonates substantially to their respective oxides, comminuting the mixture of oxides, shaping the mixture into bodies and heating the shaped bodies within the temperature range of from 600° to 850°C.

11 Claims, 3 Drawing Figures

CATALYST OF COBALT OXIDE AND A RARE EARTH METAL OXIDE AND ITS METHOD OF PREPARATION

This is a continuation of application Ser. No. 151,103 filed June 8, 1971 now abandoned.

The present invention relates to the preparation of active cobalt oxide containing catalysts. More particularly it relates to the preparation of shaped catalyst bodies comprising active cobalt oxide and metal oxides which promote the activity of the cobalt oxide, for use in industrial oxidation processes.

It is known that the activity of cobalt oxide catalyst may be promoted by the addition of certain other metal oxides.

These promoted catalysts have usually been prepared by heating mixtures of the respective nitrates until the oxides are formed and comminuting the mixture of oxides obtained. The comminuted material is then screened and a certain particle size of this material is used as a catalyst. This method of preparing catalysts is not suited for adaptation in industrial methods of preparing catalysts, since a substantial proportion of the material is lost during the preparation. The particles further lack the mechanical strength required for use in industrial processes, which causes the formation of fines and consequently an excessive pressure drop over the catalyst bed.

The mechanical strength of the catalyst prepared in this way can be improved by fusing the particles but this deactivates the catalyst since, at the temperatures required for fusing the particles, the active form of cobalt oxide reverts to its less active form and, therefore, this method cannot be employed. However, it has now surprisingly been found that promoted active cobalt oxide catalysts can be obtained which show a high conversion efficiency over extended periods of time and which are economically competitive with the precious metal catalysts generally used at present.

It is an object of the present invention to provide a method of preparing shaped catalyst bodies, comprising catalytically active cobalt oxide and a promotor, having adequate mechanical strength for use in industrial processes.

It is a further object of the present invention to provide a promoted cobalt oxide catalyst in the form of shaped bodies suitable for use in industrial oxidation or reduction processes, for example, in the oxidation of ammonia to nitric oxide.

Accordingly there is provided a method of preparing shaped catalyst bodies comprising active cobalt (II, III) oxide together with an oxide of scandium, yttrium, lanthanum, cerium, praseodymium, neodymium, samarium, europium, gadolinium, terbium, dysprosium, holmium, erbium, thulium, ytterbium or lutetium, or a mixture of at least two of these oxides, by co-precipitating from solution as carbonates or basic carbonates cobalt and at least one of the elements of the oxides washing and drying the precipitate and heating the dried precipitate within the temperature range of from 250° to 450°C for a period of time sufficient to convert the carbonates substantially into oxides, comminuting the mixture of oxides, shaping the mixture into bodies and heating the shaped bodies within the temperature range of from 600° to 850°C for a period of time sufficient to give shaped catalyst bodies suitable for use in industrial processes.

The present invention further provides catalysts in the form of shaped bodies having adequate mechanical strength for use in industrial processes and containing active cobalt (II, III) oxide together with an oxide of scandium, yttrium, lanthanum, cerium, praseodymium, neodymium, samarium, europium, gadolinium, terbium, dysprosium, holmium, erbium, thulium, ytterbium or lutetium, or a mixture of at least two of these oxides.

The solution may be an aqueous solution of a salt of cobalt and a salt of at least one of the elements scandium, yttrium, lanthanum, cerium, praseodymium, neodymium, samarium, europium, gadolinium, terbium, dysprosium, holmium, erbium, thulium, ytterbium and lutetium. The preferred salts are the nitrates since these are generally very soluble in water.

The co-precipitation may be carried out by addition to the solution of alkali metal carbonates or bicarbonates in the form of solutions of these compounds or as solids.

The co-precipitation may also be carried out by addition to the solution of ammonium compounds such as ammonium carbonate, ammonium bicarbonate, ammonium carbamate, or a mixture of these compounds.

After precipitation, the precipitate is separated by filtration. The precipitate is then thoroughly washed with hot or cold distilled water to reduce the adsorbed alkali metal ions in the precipitate to a minimum, since these ions may have a deleterious effect on the activity of the final catalyst.

When the precipitate is formed by the addition of ammonium compounds, the washing procedure becomes less critical since the adsorbed ammonium compounds will be volatilised in the subsequent drying and heating steps.

The washed precipitate is dried at approximately 110°C and then heated within the temperature range of from 250° to 450°C for a period of time sufficient to convert the carbonates or bicarbonates substantially into the corresponding oxides.

This mixture of oxides is then comminuted to form a powder. The material is formed into shaped bodies suitable for use in industrial processes by conventional methods such as extrusion, pelleting, tabletting, granulation or roll compaction. Combinations of these methods may also be used. Water or lubricating agents may be used to facilitate the formation of shaped bodies.

These shaped bodies are heated within the temperature range of from 600° to 850°C for a period of time sufficient to give the shaped bodies adequate mechanical strength for use in industrial processes. Heating of the shaped bodies may be performed in an oven or in the reactor wherein the shaped bodies will be used.

The temperature should not exceed the temperature beyond which catalytically active cobalt (II, III) oxide, $Co_3O_4$, is converted into the much less active cobalt (II) oxide, CoO, and which is approximately 850° to 900°C.

The amount of oxides other than cobalt (II, III) oxide in the shaped catalyst bodies according to the invention may be within the range of from 1 to 25 percent by mass of the composition and it is preferred to maintain the amount within the range of from 7 to 15 percent by mass.

The invention further provides a process for the oxidation of ammonia to nitrogen oxides in the presence of the catalyst prepared according to the invention, in which the catalyst temperature is approximately 150°C below the catalyst temperature in processes using precious metal catalysts.

The preferred temperature range for the catalysts according to the present invention is from 650° to 800°C.

The invention is further illustrated by the following examples without being restricted thereto.

EXAMPLE I

A number of catalysts was prepared by dissolving quantities of metal salts in water of approximately 75°C and precipitating the metals with quantities of alkali metal carbonate, or ammonium carbonate dissolved in water of approximately 75°C, to obtain precipitates in the form of basic carbonates.

The quantities of metal salts and carbonates are given in Table I, columns A and B respectively.

TABLE I

| Catalyst No. | A | B |
|---|---|---|
| 1 | 326 mass units $Co(NO_3)_2.6H_2O$ + 10 mass units $So_2O_3$ | 149 mass units $Na_2CO_3$ |
| 2 | 326 mass units $Co(NO_3)_2.6H_2O$ + 10 mass units $Y_2O_3$ + 50 volume units $HNO_3$ (55%) | $Na_2CO_3$ added until pH = 6,9 |
| 3 | 326 mass units $Co(NO_3)_2.6H_2O$ + 27,9 mass units $La(NO_3)_2.6H_2O$ | 160 mass units $Na_2CO_3$ |
| 4 | 326 mass units $Co(NO_3)_2.6H_2O$ + 26,5 mass units $Ce(NO_3)_3.6H_2O$ | 160 mass units $Na_2CO_3$ |
| 5 | 326 mass units $Co(NO_3)_2.6H_2O$ + 10,3 mass units $NdO_2$ + 15 volume units $HNO_3$ (55%) | 174 mass units $K_2CO_3$ |
| 6 | 309 mass units $Co(NO_3)_2.6H_2O$ + 10 mass units $PrO_2$ + 15 volume units $HNO_3$ (55%) | 190 mass units $(NH_4)_2CO_3$ |
| 7 | 309 mass units $Co(NO_3)_2.6H_2O$ + 10 mass units $Tb_2O_3$ + 15 volume units $HNO_3$ (55%) | 170 mass units $Na_2CO_3$ |
| 8 | 856 mass units $Co(NO_3)_2.6H_2O$ | 312 mass units $Na_2CO_3$ |

Where necessary, the insoluble oxides were first dissolved with nitric acid (55% m/m) and then added to the solution.

In each case the precipitate was filtered, slurried with hot distilled water and refiltered. The latter steps were repeated until the $Na^+$, $K^+$ or $NH_4^+$-ion content was substantially removed. Finally the filter cake was thoroughly washed with cold distilled water and dried at about 110°C. The dried precipitate was heated at 300°C for 16 hours to convert the basic carbonates substantially to their respective oxides.

The mixture of oxides was milled to pass through a 60 British Standard sieve and moistened with water. The moist material was extruded to give 4 × 4 mm extrusions. These extrusions were heated at 700°C for one hour. Some shrinkage of the extrusions was noted after the heating step and the average diameter of the extrusions decreased to 3,5 mm.

The catalysts obtained were tested in an ammonia oxidation reactor. The catalyst bed depth was 20 mm.

Figure 2:
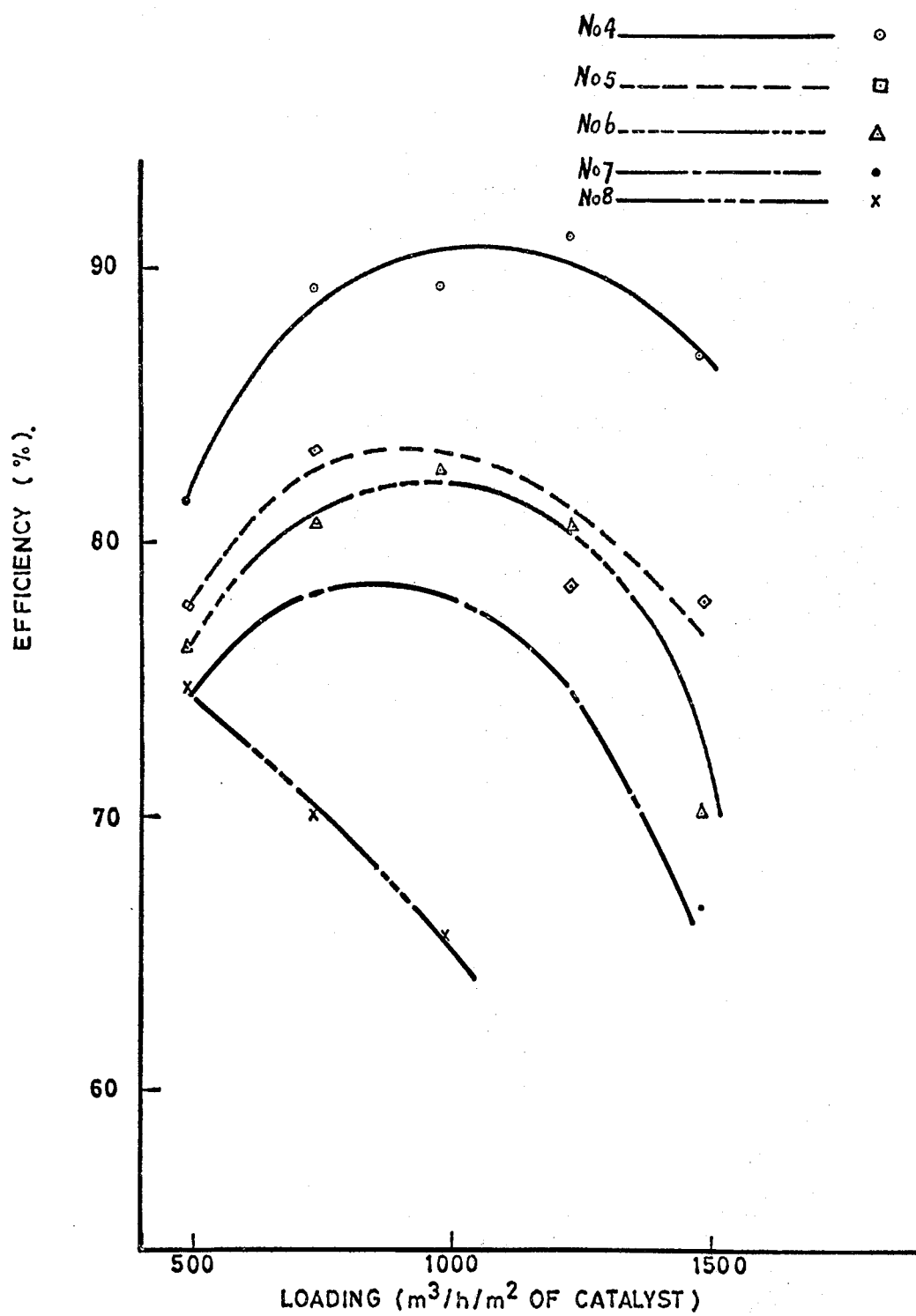

The oxidation efficiency of ammonia to nitric oxide was measured at various gas rates at a catalyst bed temperature of 650°C using an ammonia/air mixture having a volume ratio of 1:10. The results of these tests are given in FIGS. 1 and 2, in which the gas rate, expressed as loading of the catalysts in $m^3/h/m^2$, is plotted against the oxidation efficiency in per cent of ammonia converted to nitric oxide.

The results of catalyst No. 8, pure cobalt (II, III) oxide, are given in both Figures to facilitate comparison with the results of the other catalysts.

The results clearly indicate that the cobalt (II, III) oxide catalyst (No. 8) is less active than the cobalt (II, III) oxide catalysts promoted with the oxides of scandium (No. 1), yttrium (No. 2), lanthanum (No. 3), cerium (No. 4), neodymium (No. 5), praseodymium (No. 6) or terbium (No. 7).

EXAMPLE II

Two catalysts were prepared using the method described in Example I. The precipitant was sodium carbonate. One catalyst (No. 9) consisted of cobalt (II, III) oxide while the other catalyst (No. 10) contained cobalt (II, III) oxide and cerium oxide in the mass ratio of 9:1. The catalysts obtained were in the form of 4 × 4 mm extrusions, having a porosity of 18% and a surface area of 8 $m^2/g$.

The catalysts were tested in an ammonia oxidation reactor using a catalyst bed depth of 20 mm. The oxidation efficiency of ammonia to nitric oxide was measured at various gas rates at a temperature of 650°C using an ammonia/air mixture having a volume ratio of 1:10.

The tests were conducted on two consecutive days to assess the long term activity of the catalysts.

Figure 3:
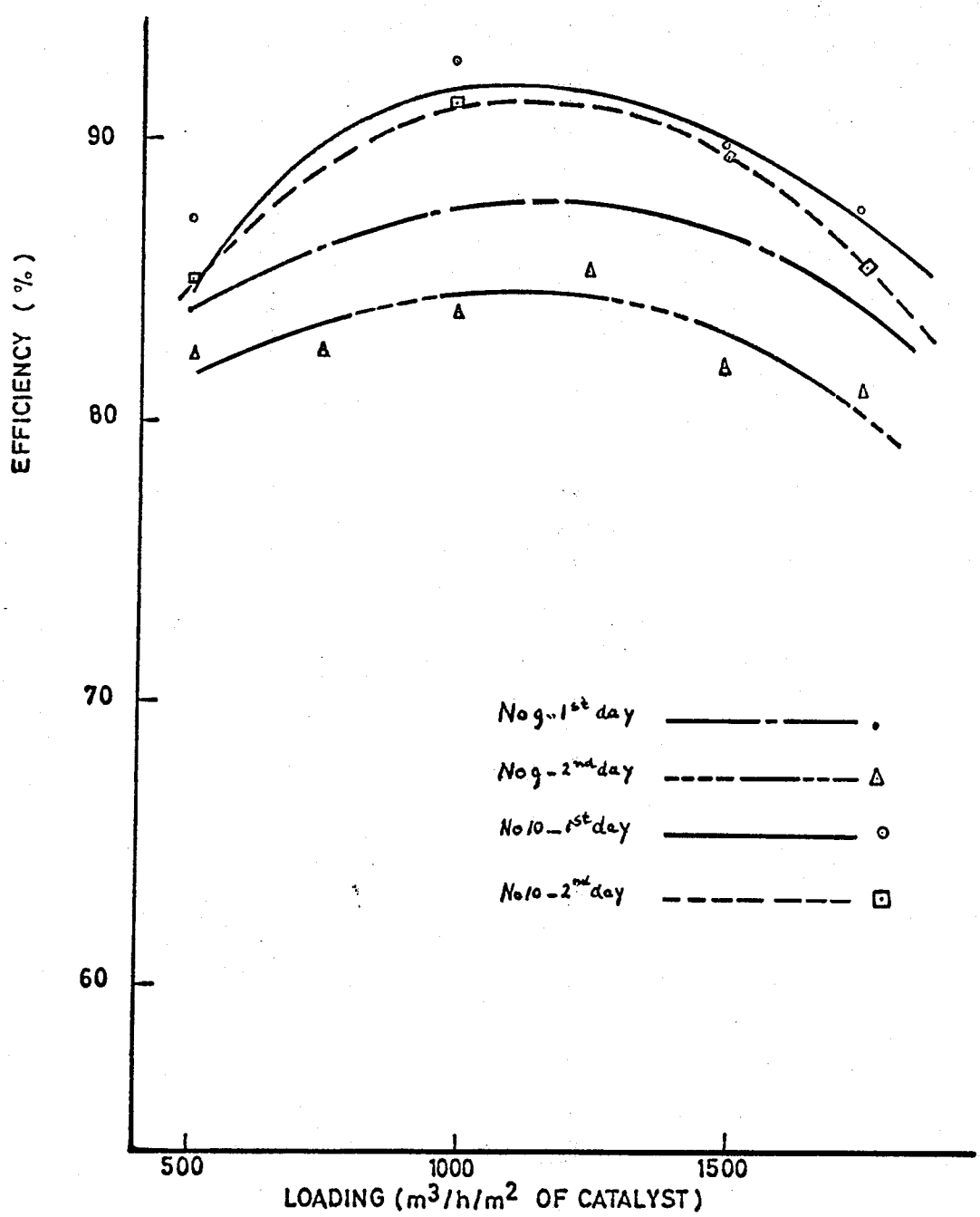

The results of these tests are given in FIG. 3, in which the gas rate, expressed as loading of the catalyst in $m^3/h/m^2$, is plotted against the oxidation efficiency in per cent of ammonia converted to nitric oxide.

The results indicate that the cerium oxide promoted catalyst (No. 10) has a higher initial activity than the pure cobalt (II, III) oxide catalyst (No. 9) and also that on the second day the activity of catalyst No. 9 decreased significantly while the activity of catalyst No. 10 remained substantially at the previous day level.

EXAMPLE III

A catalyst was prepared containing cobalt (II, III) oxide and cerium oxide in a mass ratio of 9:1 according to the method as described in Example I using ammonium carbonate as the precipitant.

The milled product was not extruded but pelleted. For this purpose the dry milled product was granulated to improve the flow properties of the product and the granules were dusted with 2 to 3 percent of graphite as a lubricant. These granules were formed into cylindrical pellets using a pelleting machine. The pellets were heated at 700°C for one hour.

The catalyst pellets thus obtained had a vertical crushing strength of 90 $kg/cm^2$ and a porosity of 18%.

The catalyst was tested in an ammonia oxidation reactor using a catalyst bed depth of 40 mm. The oxidation efficiency of ammonia to nitric oxide was measured at various gas rates at a temperature of 650°C using an ammonia/air mixture having a volume ratio of 1:10.

The results of this test are given in Table II, in which the gas rates are expressed as loading of the catalyst in $m^3/h/m^2$ and the oxidation efficiency in per cent of ammonia converted to nitric oxide.

TABLE II

| Loading ($m^3/h/m^2$) | Efficiency (%) |
|---|---|
| 500 | 92,9 |

TABLE II-Continued

| Loading (m³/h/m²) | Efficiency (%) |
|---|---|
| 750 | 94,9 |
| 1000 | 97,5 |
| 1250 | 94,1 |
| 1500 | 94,1 |

These results show that the pelleted catalyst bodies are active.

EXAMPLE IV

A cerium oxide promoted cobalt (II, III) oxide catalyst was prepared by the method as described in Example I.

The catalyst was tested in an ammonia oxidation reactor using an ammonia/air mixture having a volume ratio of 1:10. The catalyst bed-depth was 60 mm and the temperature 700°C.

The test was conducted over 900 hours, during which period pressure was varied up to 7 bar using different air rates of up to 30,000 m³/h/m².

During this run the oxidation efficiency of ammonia to nitric oxide was always above 90 percent.

This high efficiency over an extended period of time shows that the shaped catalyst bodies according to the invention are particularly suitable for the oxidation of ammonia to nitric oxide at temperatures substantially below those temperatures used in ammonia oxidation processes based on precious metal catalyst. Therefore, the shaped catalysts according to the present invention may replace the precious metal catalyst with a substantial saving in costs.

I claim:

1. Method of preparing a shaped catalyst body comprising active $Co_3O_4$ together with at least one oxide of an element selected from the group consisting of scandium, yttrium, lanthanum, cerium, praseodymium, neodymium, samarium, europium, gadolinium, terbium, dysprosium, holmium, erbium, thulium, ytterbium and lutetium, which comprises co-precipitating from solution as carbonates or basic carbonates cobalt and at least one of the elements of the oxides, washing and drying the precipitate and heating the dried precipitate within the temperature range of from 250° to 450° for a period of time sufficient to convert the carbonates substantially to their respective oxides, comminuting the mixture of oxides, shaping the mixture into bodies and heating the shaped bodies within the temperature range of from 600° to 850° for a period of time sufficient to give shaped catalyst bodies suitable for use in industrial processes, the co-precipitation being carried out by mixing an aqueous solution of a salt of cobalt and a salt of at least one of said elements and a compound selected from the group consisting of alkali metal carbonate, alkali metal bicarbonate, ammonium carbonate, ammonium carbamate or ammonium bicarbonate.

2. Method as claimed in claim 1 in which the salts are nitrates.

3. Method as claimed in claim 1 in which the precipitation is carried out by the addition of alkali metal carbonates to the solution.

4. Method as claimed in claim 1 in which the precipitation is carried out by the addition of alkali metal bicarbonates to the solution.

5. Method as claimed in claim 1 in which the precipitation is carried by the addition of ammonium carbonate to the solution.

6. Method as claimed in claim 1 in which the precipitation is carried out by the addition of ammonium bicarbonate to the solution.

7. Method as claimed in claim 1 in which the precipitation is carried out by the addition of ammonium carbamate to the solution.

8. A shaped catalyst body prepared according to the method of claim 1 containing $Co_3O_4$ and from 1 to 25 percent of the total mass of at least one of the other oxides.

9. A shaped catalyst body as claimed in claim 8 in which the content of the other oxides is within the range of from 7 to 15 percent of the total mass of the composition.

10. A shaped catalyst body prepared according to the method as claimed in claim 1.

11. A catalyst in the form of a shaped body having adequate mechanical strength for use in industrial processes and containing active $Co_3O_4$ together with at least one oxide of an element selected from the group consisting of scandium, yttrium, lanthanum, cerium, praseodymium, neodymium, samarium, europium, gadolinium, terbium, dysprosium, holmium, erbium, thulium, ytterbium and lutetium.

* * * * *